United States Patent Office 2,926,070
Patented Feb. 23, 1960

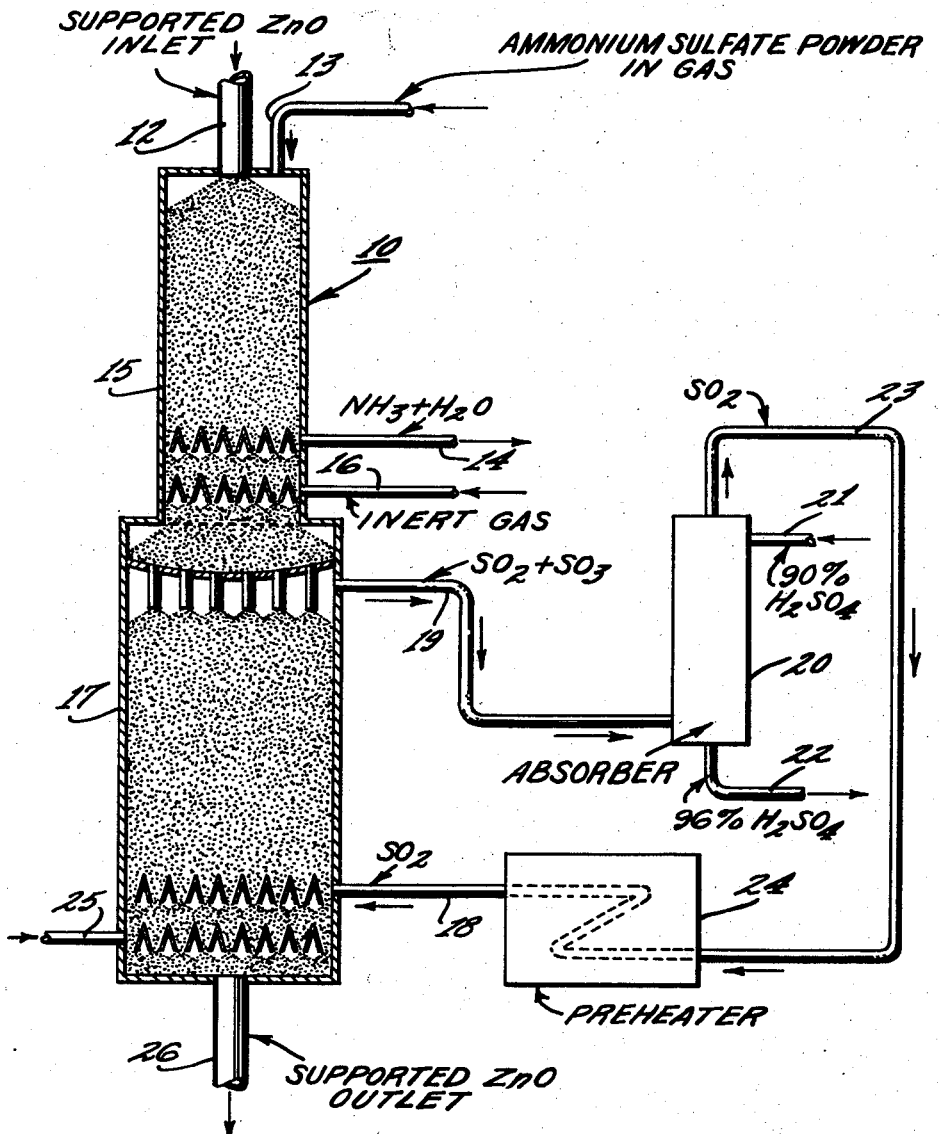

2,926,070

DECOMPOSITION OF AMMONIUM SULFATE

Thomas H. Milliken, Jr., Moylan, Pa., assignor to Houdry Process Corporation, Wilmington, Del., a corporation of Delaware Application February 23, 1954, Serial No. 412,022

4 Claims. (Cl. 23—167)

This invention relates to the treatment of ammonium sulfate and ammonium hydrogen sulfate to recover therefrom ammonia and the oxides of sulfur. It is more particularly concerned with the method of operation and with the recovery of the oxides of sulfur and particularly of the sulfur trioxide.

The disposal of large amounts of sulfuric acid which have been partially spent in the course of various treatments is frequently a serious economic and/or waste disposal problem confronting industries employing sulfuric acid in their process or systems. This problem is particularly existent in such industrial operations where sulfuric acid in large volumes s employed, such as for example in the sulfuric acid treatment of various petroleum products and in the acid treatment of clays for the production of decolorizing materials and acid-activated cracking catalyst as for the petroleum industry. The amount of sulfuric acid employed frequently is of such large volume initially that the recovery thereof would be highly desirable for financial reasons. In such instances where the economic recovery has not been practical, the safe disposal of the spent acids has been a continuing problem of appreciable extent in that there is always the possibility of creating atmospheric or stream pollution situations.

This invention provides for the economic handling of these wastes in suitable manner such that the materials may be reused and the waste disposal problem reduced to a minimum. It also provides a method whereby sulfuric acid is neutralized with ammonia and the ammonium sulfate or ammonium acid sulfate thus produced is readily and economically converted to useful products including ammonia and the oxides of sulfur.

The neutralization of sulfuric acid wastes with ammonia is an operation of long standing and is widely practiced commercially, mainly for its value in reducing the waste disposal problem rather than for its economic desirability in the production of an advantageously marketable product in the ammonium sulfate. Much of the ammonium sulfate thus produced commercially is marketed as a fertilizer which is in competition with other sources of ammonium sulfate and other fertilizer materials and is not completely economic to any high degree of desirability.

The present invention, however, has among its objects the provision of an economic method for the recovery of both ammonia and the oxides of sulfur from ammonium sulfate and ammonium acid sulfate. Another object is the recovery of these materials in a form suitable for their use, per se or with a slight additional treatment, again and again in the process, particularly as fresh sulfuric acid from the oxides of sulfur and as a neutralizing agent in the form of ammonia.

In accordance with this invention ammonium sulfate and/or ammonium acid sulfate is introduced into contact at conditions to produce gaseous ammonia and metal sulfate with a bed of high surface area particulate contact mass comprising a metal oxide readily convertible to a sulfate and which sulfate decomposes at relatively moderate temperatures in the range of 1100–1800° F. to the metal oxide and gaseous oxides of sulfur. The gaseous ammonia from the decomposition of the ammonium sulfate is separated from the bed and separately recovered, and the bed containing the metal as the sulfate is heated to a temperature sufficiently high to decompose the metal sulfate to the oxides of sulfur and metal oxide. The thus produced oxides of sulfur, namely sulfur dioxide and sulfur trioxide, are separated from the bed containing the metal oxide and the sulfur trioxide is used for concentrating somewhat diluted sulfuric acid for further use.

A better understanding of this invention will be obtained by referring to the attached drawing and to the description and claims which follow.

In the drawing the single figure is a diagrammatic exposition of one embodiment of the invention.

The primary concern for the successful operation of this process is the contact agent to be employed. Metal oxides of the type coming within the description and bounds of this invention, that is, capable of forming heat decomposable sulfates which revert to the oxide with concomitant evolution of the oxides of sulfur, are relatively widely known and include iron oxide in some of its forms, cerium oxide, chromium oxide, zinc oxide and many others. These oxides, of which zinc oxide is a preferred embodiment, react with ammonium sulfate at moderate to high temperatures in the range of about 500° to 1000° F. and preferably about 700° to 900° F. to form with the evolution of heat the metal sulfate, ammonia and water as indicated in the formula below:

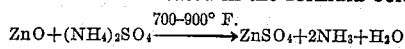

$$ZnO + (NH_4)_2SO_4 \xrightarrow{700-900° F.} ZnSO_4 + 2NH_3 + H_2O$$

This type of reaction is utilized in the operation of the present process with, however, the success thereof depending on the maintenance of high surface area available at all times in the convertible metal, as in either oxide or sulfate form but particularly in the oxide form. For instance, zinc oxide may be prepared with relatively high surface area which, beyond relatively few cycles from the oxide to the sulfate, loses its essential characteristic of high surface area with the result that while the zinc oxide is still chemically capable of performing the desired reaction, the surface area has been reduced to such a low level that the surface of the oxide available to the reaction is so limited the rate of reaction is reduced to an impractically low degree. This condition of reversion to a massive or bulky form of low surface area is not limited to zinc oxide, but is a condition which is arrived at either sooner or later with any of the other possible convertible oxides. The success of the present process, therefore, depends on the preparation of a contact agent comprising these convertible oxides which have not only initially the desired high surface area (in the order of 20–200 square meters per gram) but will continue to have a practical high surface area throughout the operation of the process so that their successful participation in the reaction will be retained at a practically high level for any period of time.

It has been found that the convertible metal oxides of the required attributes are unsuccessful for use by themselves regardless of the extent of their surface area as initially prepared in that the heats of formation and changes in the chemical state result in changes in the crystal structure which lead to the loss of surface area through the inherent increase in crystal size. This is overcome in accordance with my application Serial No. 391,176, filed November 10, 1953, now abandoned, of which my present application is a continuation-in-part, by depositing a suitable quantity of a convertible metal oxide on a high surface area support relatively inert to the conditions of the reactions encountered in this system, The amount deposited on the support may constitute as much as 30–40% of the total contact agent and should be added to the support in such manner that substantially uniform distribution thereof is obtained throughout the available surface of the support. The preparation of the contact agent in this manner appears to separate effectively the individual particles of the active portion of the contact mass in such manner that under the conditions of operation any tendency of the crystallites to increase their size by any manner is successfully negatived by sheer paucity of adjacent similar material. Under these conditions the support may also act as a stabilizer for retaining and maintaining the active ingredient in its useful physical state and condition. Thus, the available surface can suffer only a minor and inconsequential diminution and the activity or operability of the contact agent thereby continues at a level about as high through continuous use as initially. Suitable supports include activated alumina, silica and zirconia.

In accordance with my present invention, the sulfur trioxide developed by the re-decomposition of said heat-decomposable metal sulfates formed before is passed in contact with a sulfuric acid of appropriate concentration, say abue 90%, to concentrate said dilute sulfuric acid, e.g. to a concentration of about 96%, for better use either in renewed formation of ammonium sulfate to be treated in accordance with the present process, or for other purposes.

The new process may as well be operated with the use of a moving bed of contact material as with a fixed bed thereof.

Referring now to the drawing, the schematic operation in accordance with one embodiment of this invention is presented. Hot particles of metal oxide uniformly distributed on an inert support (celite) and amounting to approximately 20% ZnO to the total weight of the contact mass are filled into reactor 10 and heated to a temperature in the range of about 500–1000° F., preferably about 800° F., to insure a satisfactorily high rate of reaction between the ammonium sulfate introduced through line 13 and the supported zinc oxide in reactor 10. This reaction takes place in a manner similar to that described above in connection with the formula. During the progress of the reaction, the evolved ammonia and steam vapors together with any purge gas are continuously withdrawn from a relatively low region in reactor 10 through line 14. These vapors may be used directly to neutralize used or spent acid or may be treated or purified in any desired manner. All traces of the ammonia vapors may be swept from the solid particles by suitable inert purge gas introduced through line 16.

The zinc sulfate in lower vessel 17 has a temperature somewhat below 800° F. and is heated to decomposition temperature by a stream of gas of higher temperature, such as about 1350°–1400° F., introduced through line 18. The highest temperature reached in reaction vessel 17 is in the order of 1250–1350° F. at which temperature substantially complete decomposition to zinc oxide and the oxides of sulfur is obtained. The gas stream introduced through line 18 is sulfur dioxide gas having temperature of approximately 1250° F. or higher and introduced in sufficient volume to insure the heating of the entire bed to the above-described temperature range. The sulfur dioxide is primarily a heating gas for heating the solids to the decomposition temperature. The sulfur dioxide secondarily retards undesired side reactions (e.g. thermal decomposition of sulfur trioxide and/or thermal decomposition of zinc sulfate to form sulfur dioxide) by maintaining through the law of mass action, the highest possible concentration of sulfur dioxide. Thus, the greatest production of sulfur trioxide from the ammonium sulfate is achieved.

The maintenance of a high concentration of $SO_2$ in the gas in vessel 17 is highly desirable. One desirable aspect is that no foreign gas is thus introduced into the system. Also, that by maintaining the $SO_2$ concentration at its highest possible value, the decomposition of the zinc sulfate results in the recovery of the $SO_3$ in considerably enhanced amounts. The need to convert $SO_2$ to $SO_3$, which is necessary in the preparation of sulfuric acid particularly such of rather high concentration, is minimized or eliminated in that generally only such sulfur dioxide as is necessary to sweep the gas system and provide the necessary heat may be continuously recirculated through this portion of the system.

The effluent gases comprising $SO_2$ and $SO_3$ removed from vessel 17 through line 19 are passed through absorber 20 wherein they contact a diluted sulfuric acid stream preferably saturated with $SO_2$, such as of 90% concentration, introduced through line 21. Approximately 96% concentration acid is removed from the absorber through line 22, and the undissolved $SO_2$ through line 23. The undissolved $SO_2$ is passed to preheater 24 from which it emerges at its desired elevated temperature for reintroduction into reactor 17 through line 18. A suitable inert gas may be introduced into the lowermost region of vessel 17 through line 25 to purge the zinc oxide of traces of the oxides of sulfur.

The supported reconstituted zinc oxide is removed from the bottom of reaction vessel 17. It may be refilled into reactor 10 at 12 for further use, either by an automatic circulation system or in another convenient manner. It is to be understood that while the foregoing embodiment has been concerned with ammonium sulfate similar principles are applicable to the decomposition of ammonium hydrogen sulfate.

*Example I*

A contact mass for this process was prepared as follows:

An aqueous solution of zinc sulfate was prepared by dissolving 427.5 parts by weight of $ZnSO_4 \cdot 7H_2O$ in sufficient water to make 1200 parts by volume having a specific gravity of 1.20 at 20° C. Diatomaceous earth (celite) in the form of cylindrical pellets approximately 4 mm. in diameter and 4 mm. in length was treated with the zinc sulfate solution, previously heated to about 50° C., and allowed to soak in the solution for 30 minutes at a temperature of 80° C. The treated pellets were separated from the excess liquid, dried for 2 hours at 230° F. and then heated for 2 hours at 1300° F. in flowing dry air. These pellets, after cooling, were again treated with a fresh zinc sulfate solution of somewhat greater concentration (600 parts of $ZnSO_4 \cdot 7H_2O$ in 1000 parts of solution). Conditions of the second treatment were similar to those of the first treatment as were the conditions of subsequent drying and heating.

After cooling, the pellets were treated a third time with fresh zinc sulfate solution containing about 320 parts of $ZnSO_4 \cdot 7H_2O$ in 470 parts of solution. The pellets were again separated from any excess liquid, dried as previously, and then heated at 1300° F. for 4 hours in flowing dry air.

The bulk density of the final material was 0.75 kg./l. as compared to the bulk density of about 0.56 for the original celite pellets; and the amount of added $ZnSO_4$ as ZnO was approximately 25% by weight of the total mass.

*Example II*

A second contact mass was prepared by impregnating activated alumina of commerce with zinc sulfate. An aqueous solution of zinc sulfate was prepared by dissolving 1050 parts by weight of $ZnSO_4 \cdot 7H_2O$ in sufficient water to make 1500 parts by volume. This solution after heating to about 90° C. was used to treat 920 parts by weight of commercial (Harshaw) activated alumina pellets. After the pellets had soaked for twenty minutes the excess liquid was drained, and the treated pellets were dried for two hours at 230° F. and then heat treated at 1300° F. for 4 hours in a stream of dried air. The impregnated pellets, after cooling, were given a second treatment with 700 parts by volume of an aqueous solution containing 700 parts by weight of $ZnSO_4 \cdot 7H_2O$. After soaking for thirty minutes, the excess liquid was drained and the pellets were dried and heat treated as previously. The pellets contained approximately 17.2% ZnO by weight of the total mass.

Effective contact masses comprising chromium or iron are prepared in similar manner.

*Example III*

The contact mass of Example II comprising zinc supported on alumina was used as described below.

A portion of the contact mass amounting to 150 parts after heating to 800° F. and purging with nitrogen was contacted with 10 parts of ammonium hydrogen sulfate ($NH_4HSO_4$). The contact time was approximately 40 minutes and the product gas was tested for ammonium content by passage through a standardized solution of 0.1 N HCl. The HCl solution upon titration with 0.1 N NaOH solution was found to contain 0.95 part ammonia which was equal to 60% of the total ammonia present in the ammonium hydrogen sulfate charge.

The contact mass was subsequently substantially freed of any remaining ammonium hydrogen sulfate by heating and purging and the temperature raised to about 1200° F. and sulfur dioxide passed over the contact mass with the effluent gas passed through about 90% sulfuric acid solution to effectively saturate the solution with $SO_2$. The temperature of the contact mass was then raised to 1400° F. and the flow of $SO_2$ continued. The sulfur trioxide released at these conditions was absorbed from the effluent gas stream in the $SO_2$ saturated sulfuric acid solution and the quantity of sorbed $SO_3$ was determined by weight. The weight increase due to sorbed $SO_3$ was approximately 3.34 parts or equivalent to 80% of the total theoretical $SO_3$ possible (based on the 60% conversion of the $NH_4HSO_4$ in the preceding stage). An about 96% sulfuric acid may thus be recovered.

Obviously many modifications and variations of the invention as hereinbefore set forth may be made without departing from the spirit and scope thereof, and, therefore, only such limitations should be made as are indicated in the appended claims.

What is claimed is:

1. In the method of preparing ammonia and sulfuric acid by decomposition of at least one salt from the group consisting of ammonium sulfate and acid ammonium sulfate by contacting said salt with a contact material comprising zinc oxide at 500–1000° F. to generate ammonia gas and to form zinc sulfate in the contact material, heating the thus formed contact material to thermally decompose the zinc sulfate to generate oxides of sulfur, and recycling the resulting zinc oxide containing contact material to contact additional amounts of said salt, the improvement which comprises: employing sulfur dioxide gas as a heat-transfer gas; heating said sulfur dioxide gas to a temperature above about 1350°; passing said preheated sulfur dioxide into the contact material comprising zinc sulfate to heat said contact material from a temperature below 1000° F. to a temperature above 1250° F. to decompose zinc sulfate into zinc oxide and sulfur trioxide, the formation of sulfur dioxide by thermal decompositions being effectively repressed by the presence of the atmosphere of sulfur dioxide heat transfer gas; withdrawing the effluent gases from the zinc sulfate decomposition zone; extracting sulfur trioxide from said effluent gases by absorption in an aqueous solution of sulfuric acid; withdrawing as a product of the process the thus concentrated sulfuric acid; and recycling sulfur dioxide gas as a heat transfer gas to the heating step.

2. The method of claim 1 in which the zinc sulfate is decomposed below 1800° F.

3. The method of claim 1 in which the contact material consists of granular particles consisting essentially of a minor portion of zinc oxide supported on a relatively inert porous carrier having a surface area within the range from about 20 to 200 square meters per gram.

4. The method of claim 3 in which the contact material is heated by the sulfur dioxide to 1400° F., in which the aqueous sulfuric acid is about 90% sulfuric acid and in which the absorbed sulfur trioxide concentrates the withdrawn sulfuric acid to about 96% sulfuric acid.

References Cited in the file of this patent

UNITED STATES PATENTS

| | | |
|---|---|---|
| 1,258,934 | Nitchie | Mar. 12, 1918 |
| 1,582,347 | Read et al. | Apr. 27, 1926 |
| 1,779,841 | Fischer | Oct. 28, 1930 |
| 2,199,691 | Carter | May 7, 1940 |

FOREIGN PATENTS

| | | |
|---|---|---|
| 656,145 | Great Britain | Aug. 15, 1951 |

OTHER REFERENCES

Lowery (Inorganic Chemistry) p. 897, MacMillan and Co. Limited, London, 1931.

UNITED STATES PATENT OFFICE
CERTIFICATE OF CORRECTION

Patent No. 2,926,070                                    February 23, 1960

Thomas H. Milliken, Jr.

It is hereby certified that error appears in the printed specification of the above numbered patent requiring correction and that the said Letters Patent should read as corrected below.

Column 3, line 23, for "appropriate" read -- minor --; line 24, for "abue" read -- about --; line 60, for "is sulfur dioxide" read -- may be any suitable or inert gas, preferably free of carbon dioxide, such as flue --; same column 3, line 64, for "The sulfur dioxide is primarily a heating gas for" read -- Preferably the gas introduced through line 18 is sulfur dioxide. The use of sulfur dioxide as the heating gas serves a dual-function, namely that of --; line 65, beginning with ". The sul-" strike out all to and including "oxide) by" in line 69, same column, and insert instead -- and in --; column 3, lines 70 and 71, for "concentration of sulfur dioxide. Thus," read -- equilibrium value of sulfur dioxide for --; line 72, strike out "is achieved".

Signed and sealed this 20th day of December 1960.

(SEAL)
Attest:

KARL H. AXLINE                                          ROBERT C. WATSON
Attesting Officer                                Commissioner of Patents